(12) United States Patent
Sorensen et al.

(10) Patent No.: US 9,782,813 B2
(45) Date of Patent: Oct. 10, 2017

(54) APPARATUS AND METHOD FOR BENDING COILED TUBING

(71) Applicant: QUALITY INTERVENTION AS, Balestrand (NO)

(72) Inventors: Bjorn Bro Sorensen, Balestrand (NO); Bjarne Kare Langeteig, Balestrand (NO)

(73) Assignee: Quality Intervention AS, Balestrand (NO)

( * ) Notice: Subject to any disclaimer, the term of this patent is extended or adjusted under 35 U.S.C. 154(b) by 123 days.

(21) Appl. No.: 14/443,008

(22) PCT Filed: Nov. 15, 2013

(86) PCT No.: PCT/GB2013/053017
§ 371 (c)(1),
(2) Date: May 14, 2015

(87) PCT Pub. No.: WO2014/076489
PCT Pub. Date: May 22, 2014

(65) Prior Publication Data
US 2015/0290691 A1    Oct. 15, 2015

(30) Foreign Application Priority Data

Nov. 16, 2012 (GB) .................................. 1220671.0

(51) Int. Cl.
*B21D 7/08*   (2006.01)
*E21B 19/22*  (2006.01)
(Continued)

(52) U.S. Cl.
CPC .............. *B21D 7/085* (2013.01); *B21D 3/16* (2013.01); *E21B 17/20* (2013.01); *E21B 19/22* (2013.01)

(58) Field of Classification Search
CPC ........ E21B 19/22; E21B 33/068; E21B 17/20; E21B 21/00; E21B 33/03; E21B 7/061; E21B 3/16; E21B 7/085; E21B 3/05
See application file for complete search history.

(56) References Cited

U.S. PATENT DOCUMENTS

| 5,469,925 A | 11/1995 | Mueller et al. |
| 7,997,347 B2 * | 8/2011 | McKee .................... B21D 3/05 |
| | | 166/384 |

(Continued)

FOREIGN PATENT DOCUMENTS

| WO | WO 2011/071389 | 6/2011 |
| WO | WO 2011/107889 | 9/2011 |

OTHER PUBLICATIONS

International Search Report of International Application No. PCT/GB2013/053017 dated Oct. 24, 2014, 5 pages.

(Continued)

*Primary Examiner* — Peter DungBa Vo
*Assistant Examiner* — John S Lowe
(74) *Attorney, Agent, or Firm* — Fay Sharpe LLP (57) ABSTRACT

Apparatus for bending a coiled tubing, the apparatus having a head portion for lateral insertion in a side opening in a wall of a well, the head portion defining a bending path for bending the coiled tubing during feeding thereof through the head portion, and the head portion having a coiled tubing straightener for straightening the coiled tubing during feeding. The coiled tubing straightener is retractable so that it can adopt a retracted position, for lateral insertion of the head portion into the side opening of the well wall. The head portion has, when the straightener is in the retracted position, a profile as viewed in the direction of lateral insertion, and the straightener being extendable for operation to (Continued)

straighten the coiled tubing to an extended position at least partly outside of the profile of the head portion.

13 Claims, 5 Drawing Sheets

(51) Int. Cl.
    *B21D 3/16*     (2006.01)
    *E21B 17/20*     (2006.01)

(56) References Cited

U.S. PATENT DOCUMENTS

| | | | |
|---|---|---|---|
| 9,045,954 B2* | 6/2015 | Langeteig | E21B 19/22 |
| 2010/0181078 A1 | 7/2010 | McKee | |
| 2010/0319933 A1 | 12/2010 | Baugh | |

OTHER PUBLICATIONS

Written Opinion of the International Searching Authority of International Application No. PCT/GB2013/053017 dated Oct. 24, 2014, 5 pages.

British Search Report of corresponding British Application No. 1220671.0 dated Feb. 5, 2013, 3 pages.

* cited by examiner

APPARATUS AND METHOD FOR BENDING COILED TUBING

BACKGROUND

The invention relates to apparatus and a method for bending coiled tubing.

It is known from WO 2011/071389 to provide an injection module for lateral insertion and bending of a coiled tubing via a side opening in a well. The module comprises an insertion device for insertion in a side opening in a well, for example a petroleum well, an injection well, a water well or a geothermal well. The insertion device has a bending head which defines a bending path along which a coiled tubing is fed laterally through the side opening. The bending path is curved so as directionally to deviate the coiled tubing as it is fed along the path. The coiled tubing may thus be deviated from a lateral direction to a downward direction, for example into an annulus between casings in the well. The bending head is designed to deviate the coiled tubing through approximately 90°.

Downstream, in the direction of insertion, of the curved part of the bending path where the coiled tubing has been bent, it is desirable to stabilise or straighten the coiled tubing from the bent condition to a generally straight condition. In one embodiment, in which the bending path is provided by a curved passage, this is achieved by providing a straight downwardly directed passage downstream of the curved passage. In another embodiment, in which the coiled tubing is passed between two opposed rotating wheels, one of which forms the inside of the curved bending path, a directional stabiliser is provided downstream of the opposed wheels. The directional stabiliser has a concave contact surface for engaging laterally against the coiled tubing so as to steer it directionally as it is discharged from the bending head. The supporting force exerted by the directional stabiliser on the coiled tubing is adjustable by means of a hydraulic piston.

In both embodiments, both the bending part of the insertion device and the straightening part are sized to fit within the diameter of the side opening of the wall of the well. The straightener, which is at the outlet of the insertion device, can therefore be inserted into the side opening and adopt a position radially inwardly of the wall, e.g. inside the annulus between casings, where the straightening process is carried out.

BRIEF SUMMARY

Viewed from one aspect the invention provides Apparatus for bending a coiled tubing, the apparatus having a head portion for lateral insertion in a side opening in a wall of a well, the head portion defining a bending path for bending the coiled tubing during feeding thereof through the head portion, and the head portion having a coiled tubing straightener for straightening the coiled tubing during said feeding, the coiled tubing straightener being retractable so that it can adopt a retracted position for lateral insertion of the head portion into the side opening of the well wall, the head portion having, when the straightener is in the retracted position, a profile as viewed in the direction of lateral insertion, and the straightener being extendable for operation to straighten the coiled tubing to an extended position at least partly outside of said profile of the head portion.

Viewed from another aspect, the invention provides a method of using the apparatus to bend and straighten a coiled tubing during feeding thereof into a well. Viewed from another aspect, the invention provides a method of feeding a coiled tubing into a well using apparatus for bending coiled tubing, comprising:

laterally inserting, in a direction of lateral insertion, a head portion of the apparatus in a side opening in a wall of a well, the head portion defining a bending path for bending the coiled tubing and having a coiled tubing straightener for straightening the coiled tubing, the coiled tubing straightener being retracted during said lateral insertion to a retracted position, and the head portion having, when the straightener is in the retracted position, a profile as viewed in the direction of lateral insertion;

extending the coiled tubing straightener from the retracted position to an extended position at least partly outside the profile of the head portion as viewed in the direction of lateral insertion; and feeding a coiled tubing via the apparatus into the well so that it is bent as it follows the bending path and is then straightened by the straightener in the extended position.

Using the apparatus of the invention, when the head portion is to be laterally inserted in a side opening of the wall of the well, the coiled tubing straightener may be retracted into the retracted position. The profile of the head portion when viewed in the direction of lateral insertion will generally be such that the head portion can be laterally inserted into the side opening. Once the head portion has been inserted through the side opening the coiled tubing straightener may be extended to adopt the extended position at least partly outside the profile of the head portion. It is then in a position for operation to straighten the coiled tubing during feeding thereof into the well. The head portion can thus occupy a relatively small space during insertion into the side opening, because the straightener may be retracted during this insertion. This allows the head portion to be inserted in a smaller side opening compared to known systems.

Many wells requiring e.g. intervention processes where access for a coiled tubing is desired, have smaller side openings. Thus, the present invention allows coiled tubing to be fed into the well via these smaller side openings. For example, the apparatus may have a head portion insertable into a side opening of less than 40 mm internal diameter, for example 36 mm.

In general, coiled tubing which is bent through a radius which is too small may suffer plastic deformation or other damage. In the known systems, the profile of the side opening as viewed in the direction of lateral insertion, was used both to bend the coiled tubing and to straighten it. By providing a straightener which extends to an extended position at least partly outside the profile of the head portion, and hence outside the profile of the side opening as viewed in the direction of lateral insertion, most or all of the side opening profile may be used for the bending and some or all of the straightening may take place outside of that profile. Therefore, for a given side opening profile size (for example a circular profile with a given diameter), the coiled tubing may be bent to a larger radius than was achieved by the known systems.

In preferred embodiments the coiled tubing is bent from a lateral direction to a direction down the well. The straightener may be extendable to an extended position which is at least partly below the side opening for operation to straighten the coiled tubing. It is effectively below the profile of the side opening as viewed in the direction of lateral insertion. This may be a horizontal direction in some embodiments.

There are a number of ways in which the straightener may move from the retracted position to the extended position.

There may be a linear movement, or a rotational movement, or a combination of linear and rotational movements. In some preferred embodiments, the straightener is arranged to be movable linearly between the retracted and extended positions. The linear movement may be in a direction intermediate between the direction of lateral insertion, for example a horizontal direction, and a direction which the coiled tubing adopts downstream of the head portion, for example a downward direction. The term "downstream" is to be understood with respect to the movement of the coiled tubing as it is fed into the well.

Preferably the straightener is slidable on a support. It may be slidable between the retracted and extended positions, and vice versa. The straightener may be slidable on the support by means of a slide portion engaging in a slot. The slot may be provided in the straightener and the slide portion on the support. In preferred embodiments, the slot is provided in the support, and the slide portion is part of the straightener.

It is desirable when the straightener is in the retracted position that it should not interfere with the path of the coiled tubing. Preferably the apparatus comprises a passage in the head portion for receiving the coiled tubing, the passage extending longitudinally along the head portion. The straightener is preferably arranged, at least when in the retracted position, to overlap the passage as viewed laterally of the longitudinal direction of the passage. In embodiments where the longitudinal direction of the passage is horizontal, the direction of the lateral view is also horizontal, perpendicular to the longitudinal horizontal direction.

With these arrangements, when the straightener is in the extended position, it may have a trailing end which is still inside of the profile of the head portion, so as to give good support to the straightener, whilst a leading end of the straightener may extend outside of the profile. Good support is desirable to resist the force applied by the coiled tubing to the straightener as straightening of the coiled tubing is effected, whilst a sufficient amount of projection of the straightener outside of the head portion profile can also be obtained.

In certain preferred embodiments, the straightener is generally "U" shaped and each arm of the "U" overlaps the passage when the head portion is viewed laterally of the longitudinal direction of the passage. The gap between the two arms of the "U" may be used to provide space for the path of the coiled tubing, for example upstream of where it is to be bent. Each arm of the "U" may provide a slot or a slide portion as discussed above for the slidability of the straightener on the support. This can provide a stable and balanced sliding arrangement.

The apparatus may comprise a slider arranged to slide to cause movement of the straightener between the retracted and extended positions. In the embodiments where the straightener is slidably supported, the movement of the slider in a first direction may, for example by a camming arrangement, cause movement of the straightener in a second direction between the retracted and extended positions. The first direction may for example be the direction of lateral insertion and the second direction may be a direction intermediate of the direction of lateral insertion and the direction followed by the coiled tubing downstream of the apparatus.

Preferably, there is provided a camming mechanism between the slider and the straightener, such that movement of the slider in the direction of lateral insertion causes movement of the straightener towards the extended position.

The straightener may be arranged to be remotely operated to move between the retracted and extended positions. This may be done by electrical or hydraulic means, but preferably remote operation is effected by mechanical means. The apparatus may have a rod extending longitudinally of the apparatus to effect remote operation of the straightener. In the embodiments having a slider to cause movement of the straightener towards the extended position, the rod is preferably connected to the slider to impart movement thereto.

The apparatus preferably comprises a rotatable control member rotation of which causes movement of the straightener between the retracted and extended positions. In preferred embodiments, a ratchet is provided to convert the rotation of the control member to a linear movement. In the embodiments having a rod connected to a slider, the ratchet may be provided between the control member and the rod.

DETAILED DESCRIPTION

In certain embodiments, an output pinion of the ratchet operates a rack connected to the rod for linear forward or rearward movement thereof.

In general, the rod may be arranged with its longitudinal axis generally parallel to the direction of lateral insertion. It may be provided below a passage for the coiled tubing which extends longitudinally of the apparatus. It may be desired for the rotatable control member to be provided at a location which is offset from the axis of the rod. There may therefore be a universal joint between the ratchet pinion and the rotatable control member, whereby the control member is rotatable about an axis which is not parallel to that of the ratchet pinion (and preferably that of the rod). The control member may be provided below the passage for the coiled tubing which extends longitudinally of the apparatus.

The apparatus may be used by inserting the head portion in a variety of wells, for example a petroleum well, an injection well, a water well or a geothermal well. It may be used to feed a coiled tubing into an annulus between two sizes of casing, or into an annulus between a formation wall and a casing, or into a well pipe in the well, for example a production tubing.

The apparatus may be used in conjunction with injection equipment for feeding the coiled tubing to the apparatus and onwards into the well. The invention extends to a combination of the apparatus and injection equipment.

BRIEF DESCRIPTION OF THE DRAWINGS

Certain preferred embodiments of the invention will now be described by way of example and with reference to the accompanying drawings, in which.

Figure 1:
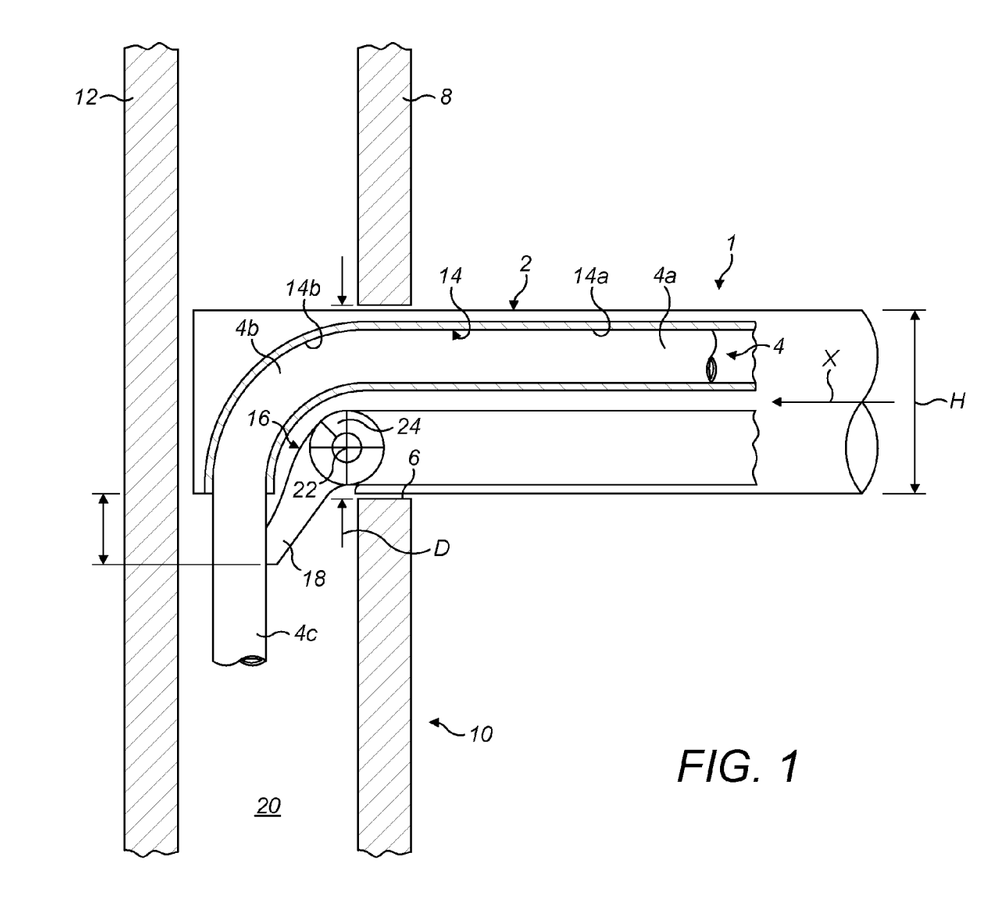
FIG. 1 is a schematic cross sectional view of a first embodiment of the apparatus for bending a coiled tubing, showing the general principle of operation.

FIG. 1 is a longitudinal section through a head portion 2 of apparatus 1 for bending a coiled tubing 4. The head portion is shown laterally inserted in a side opening 6 in a wall 8 of a well 10, i.e. inserted in a lateral insertion direction X. The longitudinal axis of the apparatus and of the head portion is arranged parallel to the lateral insertion direction of the head portion into the opening.

The opening 6 in the wall 8 is circular with a diameter D. The profile of the opening in the lateral insertion direction X is therefore circular. The diameter of the head portion in any direction transverse its longitudinal direction is sufficiently small to enable it to fit through the opening 6. For example, the height H of the head portion is smaller than the diameter D of the opening 6. The profile of the head portion as viewed in the lateral insertion direction is the same as or smaller than the profile of the side opening 6 as viewed in the lateral insertion direction, i.e. it is of a size and shape enabling the head portion to be inserted in the side opening.

The wall 8 in which the opening 6 is formed is a wall of an outer annular casing, there being an inner annular casing having a wall 12 radially inwardly of the outer casing. An annulus 20 is formed between the outer and inner annular casings.

The coiled tubing is to be fed in a downstream direction, initially from right to left as seen in FIG. 1 through the opening 6, and then curving round to progress downwardly into the annulus. The coiled tubing has an upstream portion 4a which is upstream or rearwardly of the wall 8 of the outer casing in the lateral insertion direction X, an intermediate portion 4b which is downstream or forwardly of the portion 4a, and a downstream portion 4c which is downstream or forwardly of portion 4b. The upstream portion 4a is straight, the intermediate portion 4b is curved, and the downstream portion 4c is straight. FIG. 1 shows a "snap-shot" at a moment in time as the coiled tubing is being fed, by a known injection mechanism further upstream and not shown, forwardly into the well. Thus any given part of the coiled tubing will progress from being the upstream portion, to being the intermediate portion, and then to being the downstream portion, until such time as the feeding of the coiled tubing stops.

The head portion 2 has a passage 14 through which the coiled tubing is fed. The passage 14 has a straight passage portion 14a which leads, in the downstream direction, into a curved passage portion 14b. The curved portion 14b has a centre line with a radius of curvature and is arranged to bend the coiled tubing so that its centre line, in intermediate portion 4b thereof, adopts that radius. The passage 14b defines a bending path for bending the coiled tubing during feeding thereof through the outer annular casing wall 8 from a lateral direction to a direction down the well.

The head portion has a coiled tubing straightening device 16. The straightening device has a coiled tubing straightener in the form of a straightening head 18 arranged to engage the coiled tubing at an outlet from the curved passage portion 14b. The straightening head engages the outer surface of the coiled tubing which is on the inside of the bend into which it has been formed. The straightening head 18 is arranged so that as the coiled tubing is fed via the head portion 2 into the annulus 20 between the walls 8 and 12, it engages the coiled tubing to straighten it. In the absence of the straightener, the coiled tubing would tend to retain the bent shape and may engage the inside of the well wall 8 and potentially become stuck. With the straightener, the coiled tubing is first bent by the curved passage portion 14b so as to deviate its direction from the lateral direction to a direction down the well, and it is then straightened in order to maintain this direction.

The straightening device 16 has a base 24 on which the straightening head 18 is pivotally mounted about a horizontal axis 22 and is biased by a spring (not shown) in a clockwise direction, as viewed in FIG. 1. The base 24 is linearly retractable. The straightening device 16 is shown with the straightening head 18 in an extended position for operation to straighten the coiled tubing 4. The spring bias on the straightening head 18 ensures that it engages the coiled tubing properly to effect straightening.

When the base 24 of the straightening device 16 is linearly retracted in the rearward direction (to the right in FIG. 1) the straightening head 18 pivots into a generally horizontal direction, against the spring bias. It then adopts a retracted position, which is not shown. When the straightening head 18 of the straightener 16 is in the retracted position it is inside the profile of the head portion, as viewed in the lateral insertion direction X, thereby enabling the head portion to be inserted in the side opening 6 of the wall 8. Thus, the straightening head 18 in the retracted position is also inside the profile of the side opening, as viewed in the lateral insertion direction X. Once the head portion has been so inserted, then the straightener 16 can be moved to its extended position, partly outside of the profile of the side opening as viewed in the lateral insertion direction X. This arrangement permits substantially the entire height H of the head portion to be used to bend the coiled tubing. Accordingly, more of the diameter D of the side opening 6 in the wall 8 is used for bending the coiled tubing, compared to known systems in which both the bending and the straightening had to be accomplished within the confines of this diameter D. This meant that for wells having relatively small side openings the coiled tubing would have to be bent to a radius which may cause damage thereto, rendering the method unworkable for smaller openings. By providing an arrangement in which the straightener 16 extends at least partly outside of the profile of the side opening, which in the case of this embodiment is below the lowermost part of the head portion, and hence outside the profile of the side opening, the straightening operation need not take up any of the side opening diameter D.

The embodiment of FIG. 1 illustrates the general principles of operation of the apparatus. A second embodiment, shown in FIGS. 2-10, is illustrated in more detail.

Figure 2:
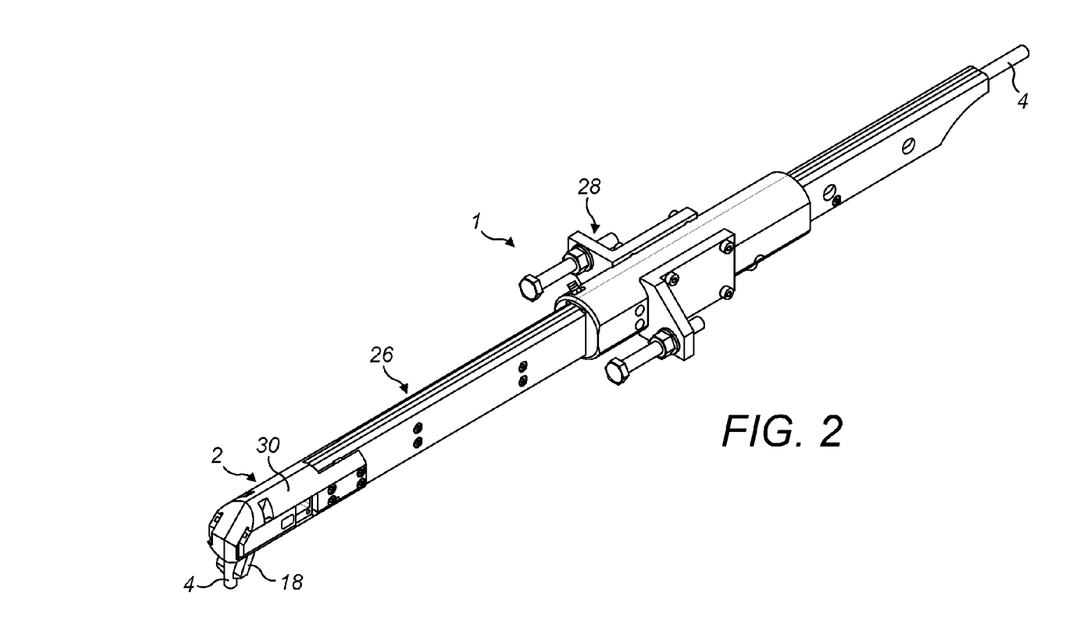
FIG. 2 is a perspective view of a second embodiment of the apparatus, showing the apparatus with its straightener in an extended position.
Figure 3:
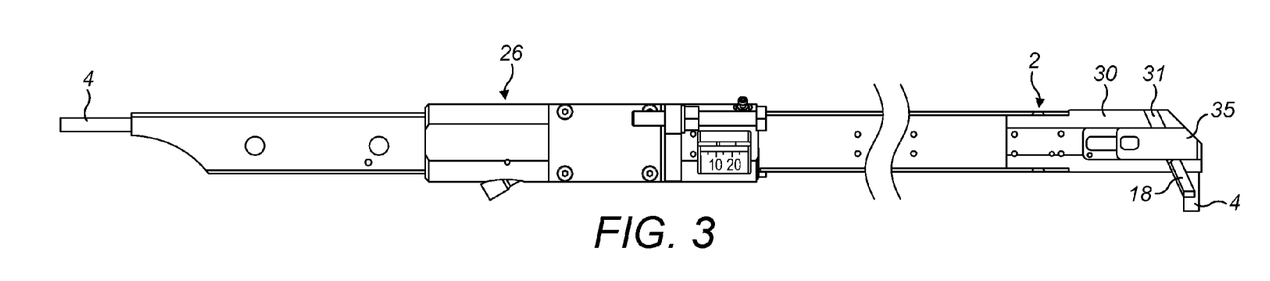
FIG. 3 is a side view of the apparatus of the second embodiment.
Figure 4:
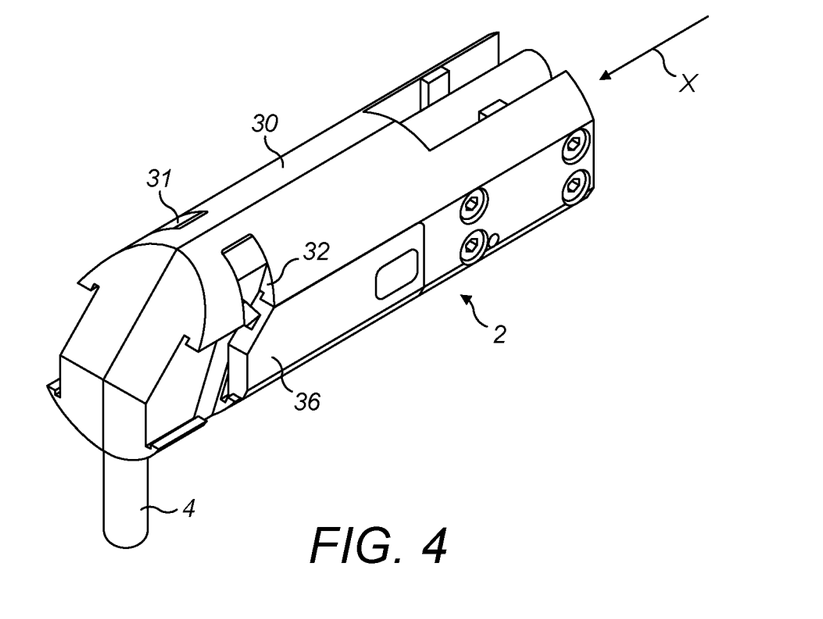
FIG. 4 is a perspective view showing the head portion of the second embodiment.
Figure 5:
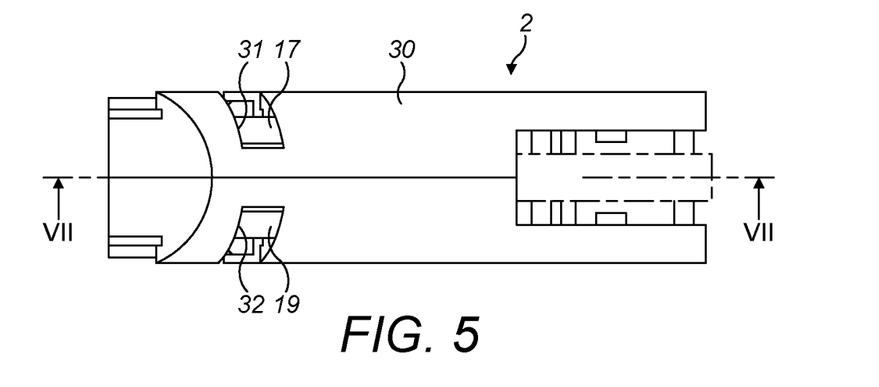
FIG. 5 is a plan view of the head portion shown in FIG. 4.

FIGS. 2 and 3 show the apparatus 1 for bending a coiled tubing, including a head portion 2 and a mandril 26. The head portion 2 is bolted to the mandril 26. The mandril 26 is provided with a flange assembly 28 for mounting to other equipment (not shown). A coiled tubing 4 extends longitudinally of the apparatus 1, extending through the mandril parallel to the lateral insertion direction and being deviated through about 90° in the head portion to a downward direction.

FIGS. 4-8 show further details of the head portion 2 of the second embodiment. The head portion has a main body 30 having in an upper region thereof a passage 14 for receiving a coiled tubing, defined between left and right body portions of the main body 30. The channel 14 has a rear portion 14a which is straight and a front portion 14b which is curved. A straightening device 16 has a straightener in the form of a straightening head 18. The straightener is generally "U" shaped as viewed in the lateral insertion direction X, comprising a pair of arms 17, 19 with a gap therebetween. The passage 14 for the coiled tubing passes through the gap when the straightening head 18 is retracted. The arms 17, 9 of the straightener, when in the retracted position, overlap the passage 14 as viewed laterally of the longitudinal direction of the passage (this direction of lateral view corresponding to the direction of the view of FIG. 7). The straightening head 18 provides a concave curved surface 18a for engagement with the outside surface of the coiled tubing below the outlet of the curved passage 14b.

The main body 30 of the head portion has a pair of guide slots 31, 32 respectively for receiving the arms 17, 19 of the straightening head 18. The guide slots are arranged at an angle intermediate between the lateral insertion direction X and the vertical direction, with their lower ends being forward of their upper ends. The straightening head is slidable in the guide slots and is constrained by them against rotational movement. The arms 17, 19 of the straightening head 18 form slide portions slidably engaged in the slots 31, 32. On the outside of each arm portion 17, 19 there is provided a respective lug 33, 34. On each side of the head portion main body 30 a respective slider 35, 36 is arranged for slidable movement in the lateral insertion direction X. Slider 35 is provided with a slot 37 and slider 36 is provided with a slot 38 arranged parallel to slot 37. The slots 37, 38 are arranged at an angle intermediate between the lateral insertion direction X and the vertical direction, with their upper ends being forward of their lower ends.

The lug 33 of arm portion 17 engages in the slot 37 of slider 35, whilst the lug 34 of arm portion 19 engages in the slot 38 of the slider 36. A control bar 39 extends laterally between the sliders 35 and 36, across the head portion main body 30 and below the passage 14 for the coiled tubing. The control bar 39 is slidably supported for forward and rearward movement in the lateral insertion direction X by a pair of slots 47 provided respectively in the left and right body portions of the main body 30, the slots 47 extending longitudinally of the main body. Each slider 35, 36 is provided with a respective aperture 40, 41 which receives a respective end of the control bar 39.

Figure 6:
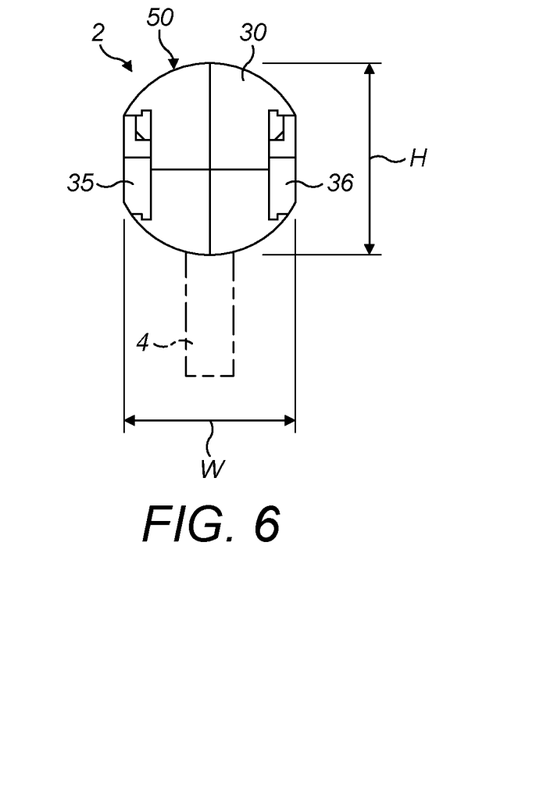
FIG. 6 is a front end view of the head portion shown in FIG. 4.
Figure 7:
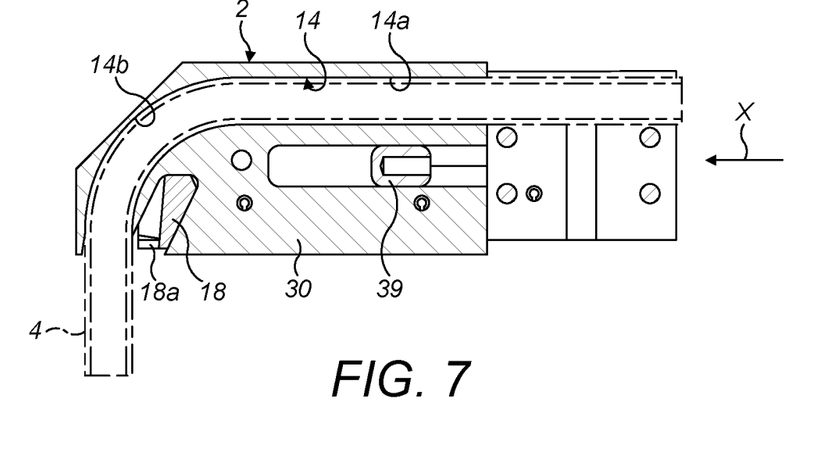
FIG. 7 is a longitudinal section on lines VII-VII of FIG. 5.
Figure 8:
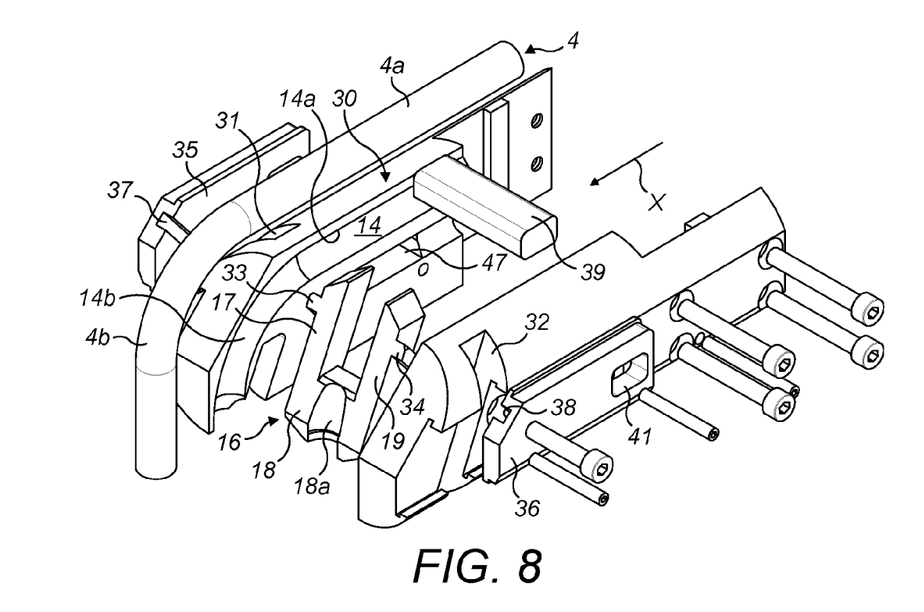
FIG. 8 is an exploded perspective view of the head portion of the second embodiment.

FIG. 6 is a front end view of the head portion 2 showing its profile as viewed counter to the lateral insertion direction X. This profile is the same as the profile viewed in the lateral insertion direction, because the directions are colinear but opposite. The head portion has a height H and a width W. Its outer perimeter 50 is made up of upper and lower curved peripheral surfaces of the main body 30 and, at the sides of the head portion, the lateral outer surfaces of the sliders 35 and 36. The coiled tubing 4 is shown in dotted outline. The profile of the head portion as viewed in the lateral insertion direction is the same as or smaller than the profile of the side opening 6 of a well wall 8 (not shown for this embodiment but shown in FIG. 1) as viewed in the lateral insertion direction, i.e. it is of a size and shape enabling the head portion to be inserted in the side opening. When the straightening head 18 of the straightening device 16 is in its extended position for straightening of the coiled tubing 4, then the straightening head 18 extends at least partly outside of the profile of the head portion as viewed in the lateral insertion direction. The condition of the apparatus in which the straightening head 18 is in the extended position is shown in FIGS. 2 and 3. The straightening head 18 then extends below the height H of the head portion.

Figure 9:
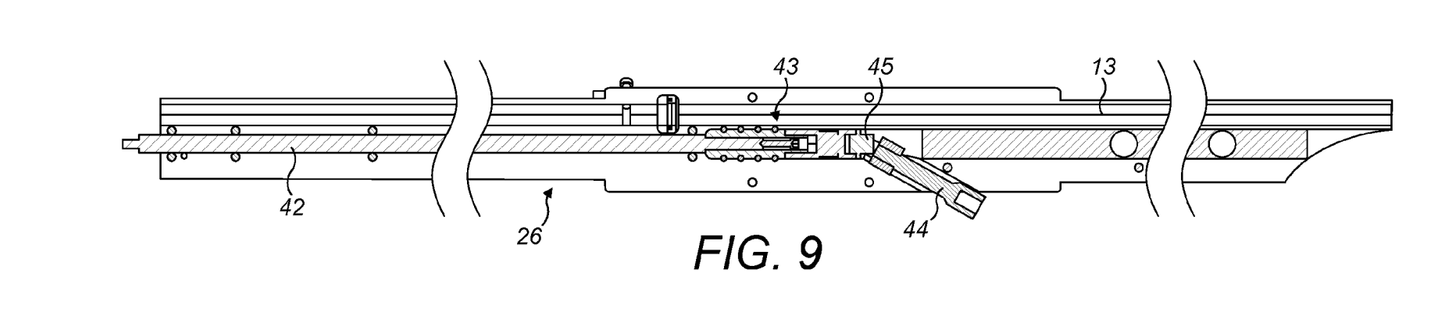
FIG. 9 is a longitudinal cross-sectional view of a mandril of the apparatus.

The arrangement for moving the control bar 39 forwardly and rearwardly will now be described with reference to FIG. 9, which shows the mandril 26 of the apparatus of the second embodiment. The control bar 39 is connected to a rod 42 which is arranged to move forwardly and rearwardly in the mandril 26. At the rear of the rod 42 a ratchet mechanism 43 is provided. To the rear of the ratchet mechanism a rotatable control member 44 is connected thereto by a universal joint 45. The ratchet mechanism 45 has a pinion member 46. The ratchet mechanism 43 converts rotation of the control member 44 into linear movement of the push rod 42 which is transmitted to the control bar 39. The arrangement allows rotation of the control member 44 to move the straightening head 18 between the extended and retracted positions. The amount of movement determines the extent to which the straightening head is extended outside of the profile of the head portion. The ratchet mechanism may be provided with an adjustment nut or other means to set a forward stop position of the rod 42, so that the location of the extended position of the straightening head can be set as desired. With this arrangement, as the control member 44 is rotated to advance the straightening head 18 out of the retracted position, it will be stopped in accordance with the setting of the ratchet mechanism 43.

The mandril 26 has a passage 13 for the coiled tubing 4. When the head portion 2 and the mandril 26 are bolted together, as shown in FIGS. 2 and 3, the coiled tubing passage 13 of the mandril aligns with the coiled tubing passage 14 of the head portion.

The operation of the apparatus of the second embodiment, when coiled tubing feeding into a well is to be carried out, will now be described. The straightening head 18 is initially in the retracted position, whereby it does not extend outside of the profile of the head portion. The head portion is inserted through the side opening 6 into the annulus 20 between the well walls 8 and 12 (see FIG. 1).

At this time, the control bar 39 is in a rearward position and the sliders 35, 36 adopt a rearward position. The lugs 33, 34 of the straightening head 18 are then located in a position towards the top of the respective slots 37, 38 in the sliders 35, 36.

The rotatable control member 44 of the mandril 26 (see FIG. 9) is rotated to advance the push rod 42 forwardly, towards the well. This advances the control bar 39 forwardly to cause forward movement of the sliders 35, 36 in the lateral insertion direction. The forward movement of the slots 37, 38 of the sliders, by a camming arrangement, causes the lugs 33, 34 to slide downwardly along the slots 37, 38. This causes the straightening head 18 to slide downwardly and forwardly as guided by the guide slots 31, 32, into its extended position. The apparatus is then ready for feeding of the coiled tubing into the well via the side opening 6 in the well wall 8. As the coiled tubing is fed, it is first bent and downwardly directed by the curved passage portion 14b, and it is then straightened by the straightener or straightening head 18.

In the illustrated embodiments the head portion 2 of the apparatus is inserted laterally with respect to the well and in a horizontal orientation through the opening 6 into the well. In alternative embodiments, the opening may be arranged with an axis at an inclination to the horizontal, in which case the head portion would be inserted along that inclined axis. The lateral insertion direction would be along the inclined axis. Thus the apparatus of the invention is applicable to wells with inclined wall openings, and is not limited to use with wells with wall openings having a horizontal axis.

The invention claimed is:

1. Apparatus for bending a coiled tubing, the apparatus having a head portion for lateral insertion in a direction of lateral insertion into a side opening in a wall of a well, the head portion defining a bending path for bending the coiled tubing during feeding thereof through the head portion, the head portion having a profile as viewed in the direction of lateral insertion of a shape that fits into that of said side opening of a wall of a well, and the head portion having a coiled tubing straightener for straightening the coiled tubing during said feeding, the coiled tubing straightener being retractable so that it can adopt a retracted position for lateral insertion of the head portion having said profile into the side opening of the well wall, and the straightener being extendable for operation to straighten the coiled tubing to an extended position at least partly outside of said profile of the head portion.

2. Apparatus as claimed in claim 1, wherein the straightener is arranged to be movable linearly between the retracted and extended positions.

3. Apparatus as claimed in claim 2, wherein the linear movement is in a direction intermediate between the direction of lateral insertion and a direction which the coiled tubing adopts downstream of the head portion.

4. Apparatus as claimed in claim 1, wherein the straightener is slidable on a support.

5. Apparatus as claimed in claim 4, wherein the straightener is slidable on the support by means of a slide portion engaging in a slot.

6. Apparatus as claimed in claim 1, comprising a passage in the head portion for receiving the coiled tubing, the passage extending longitudinally along the head portion, and wherein the straightener is arranged, at least when in the retracted position, to overlap the passage as viewed laterally of the longitudinal direction of the passage.

7. Apparatus as claimed in claim 6, wherein the straightener is generally "U" shaped and each arm of the "U" overlaps the passage when the head portion is viewed laterally of the longitudinal direction of the passage.

8. Apparatus as claimed in claim 1, comprising a slider arranged to slide to cause movement of the straightener between the retracted and extended portions.

9. Apparatus as claimed in claim 8, comprising a camming mechanism between the slider and the straightener, such that movement of the slider in the direction of lateral insertion causes movement of the straightener towards the extended position.

10. Apparatus as claimed in claim 1, wherein the straightener is arranged to be remotely operated to move between the retracted and extended positions.

11. Apparatus as claimed in claim 10, comprising a rod extending longitudinally of the apparatus to effect remote operation of the straightener.

12. Apparatus as claimed in claim 1, comprising a rotatable control member rotation of which causes movement of the straightener between the retracted and extended positions.

13. A method of feeding a coned tubing into a well using apparatus for bending coned tubing, comprising:
  laterally inserting, in a direction of lateral insertion, a head portion of the apparatus in a side opening in a wall of a well, the head portion defining a bending path for bending the coiled tubing and having a coiled tubing straightener for straightening the coiled tubing, the coiled tubing straightener being retracted during said lateral insertion to a retracted position, and the head portion having, when the straightener is in the retracted position, a profile of a shape for insertion into that of said side opening in the wall of the well as viewed in the direction of lateral insertion;
  extending the coiled tubing straightener from the retracted position to an extended position at least partly outside the profile of the head portion as viewed in the direction of lateral insertion; and
  feeding a coiled tubing via the apparatus into the well so that it is bent as it follows the bending path and is then straightened by the straightener in the extended position.

* * * * *

UNITED STATES PATENT AND TRADEMARK OFFICE
CERTIFICATE OF CORRECTION

PATENT NO. : 9,782,813 B2
APPLICATION NO. : 14/443008
DATED : October 10, 2017
INVENTOR(S) : Bjorn Bro Sorensen and Bjarne Kare Langeteig It is certified that error appears in the above-identified patent and that said Letters Patent is hereby corrected as shown below:

In the Claims

In Column 10, Line 14 (Line 1 of Claim 13), "coned" should read --coiled--.

In Column 10, Line 15 (Line 2 of Claim 13), "coned" should read --coiled--.

Signed and Sealed this
Thirteenth Day of March, 2018

Andrei Iancu
*Director of the United States Patent and Trademark Office*